United States Patent [19]
de Briel et al.

[11] Patent Number: 5,135,094
[45] Date of Patent: Aug. 4, 1992

[54] FRICTION DISC, IN PARTICULAR FOR A CLUTCH

[75] Inventors: Jacques T. de Briel, Levallois-Perret; André Dalbiez, Argenteuil, both of France

[73] Assignee: Valeo, Paris, France

[21] Appl. No.: 718,270

[22] Filed: Jun. 20, 1991

[30] Foreign Application Priority Data

Jun. 22, 1990 [FR] France .................. 9007825

[51] Int. Cl.$^5$ .................................. F16D 13/60
[52] U.S. Cl. ........................ 192/107 R; 192/107C
[58] Field of Search .................. 192/107 R, 107 C

[56] References Cited

U.S. PATENT DOCUMENTS

| | | | |
|---|---|---|---|
| 1,927,995 | 9/1933 | Stanley | 192/107 R |
| 2,119,025 | 5/1938 | Reed | 192/107 C |
| 3,164,236 | 1/1965 | Baynes et al. | 192/107 C |
| 3,209,876 | 10/1965 | Kraft | 192/107 R |
| 3,807,534 | 4/1974 | Eldred | 192/107 R X |
| 3,913,716 | 10/1975 | Sedlock | 192/107 R |
| 4,375,254 | 3/1983 | Lech Jr. | 192/107 C |
| 4,848,553 | 7/1989 | Cameron | 192/107 R |
| 4,858,742 | 8/1989 | Cameron | 192/107 C |
| 4,860,872 | 8/1989 | Floton | 192/107 R |
| 4,869,356 | 9/1989 | Cameron | 192/107 M |
| 4,941,558 | 7/1990 | Schraut | 192/107 C |

FOREIGN PATENT DOCUMENTS

| | | |
|---|---|---|
| 2751043 | 5/1978 | Fed. Rep. of Germany ... 192/107 C |
| 3519245 | 12/1985 | Fed. Rep. of Germany ... 192/107 C |
| 1326139 | 3/1963 | France . |
| 2375494 | 7/1978 | France . |
| 2140881 | 12/1984 | United Kingdom . |

Primary Examiner—Leslie A. Braun
Assistant Examiner—Nicholas Whitelaw
Attorney, Agent, or Firm—Longacre & White

[57] ABSTRACT

A friction disc, in particular for a motor vehicle clutch, comprises a carrier member in the form of a simple thin metal radial disc, with a plurality of friction pads distributed on the carrier disc coaxially with it. Each friction pad is fastened to the carrier disc by at least one fastening member, and is in the form of two pad portions arranged respectively on either side of the carrier disc. The carrier disc is formed with windows, with each friction pad being mounted in line with a respective one of these windows, in such a way that it can at least partially engage in the window at its periphery. The window defines a tongue which is fixed with respect to the carrier disc and extends into the window, and the fastening member, or each fastening member, for each friction pad is secured to the corresponding tongue.

10 Claims, 2 Drawing Sheets

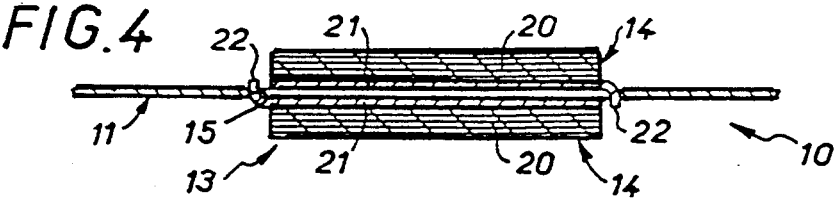
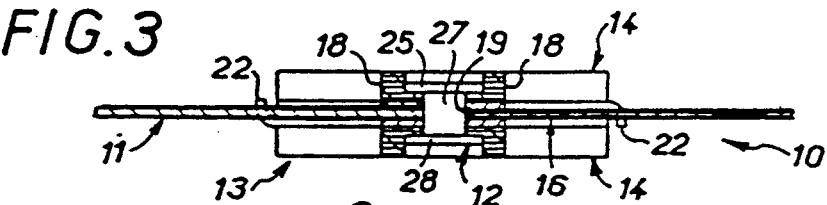
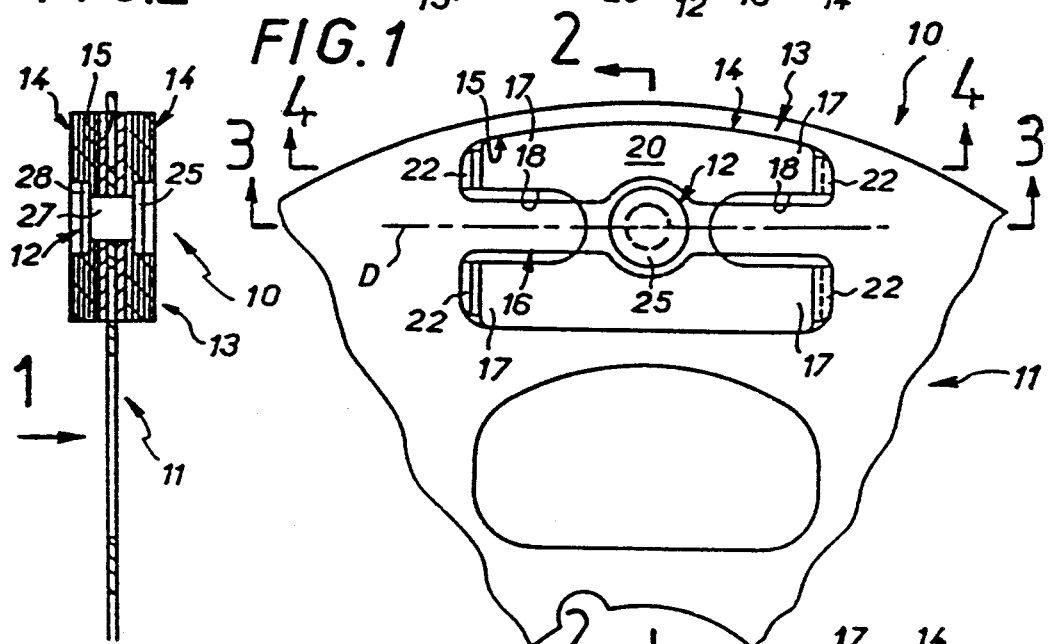
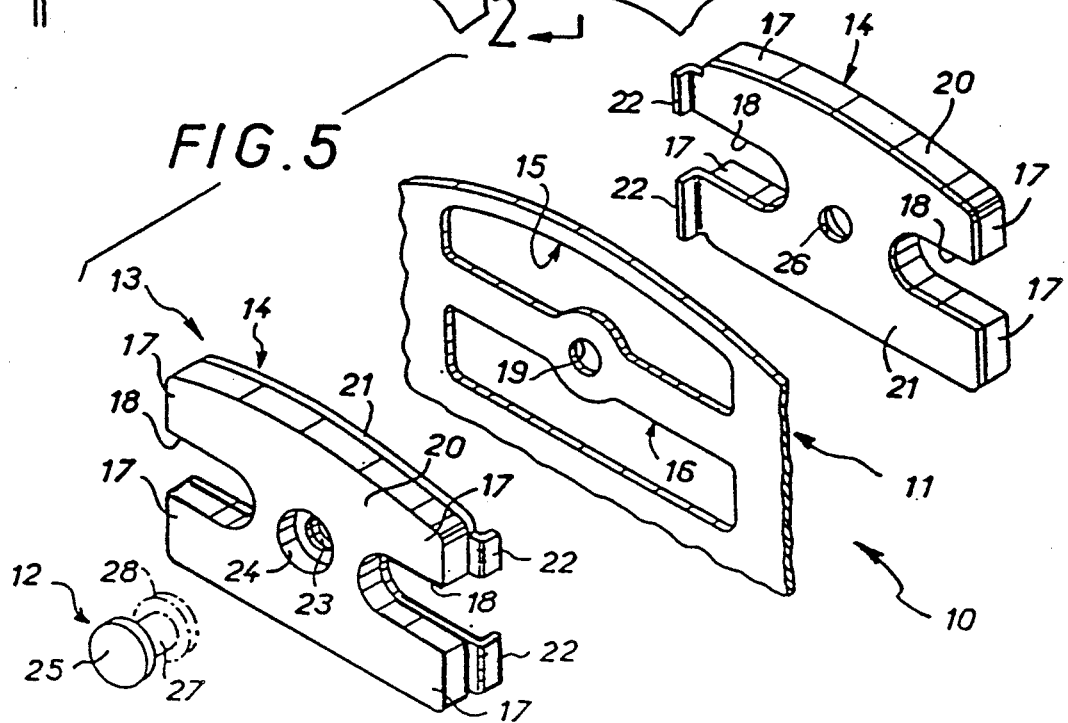

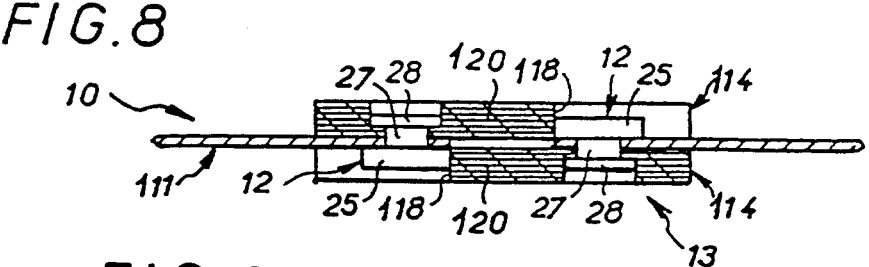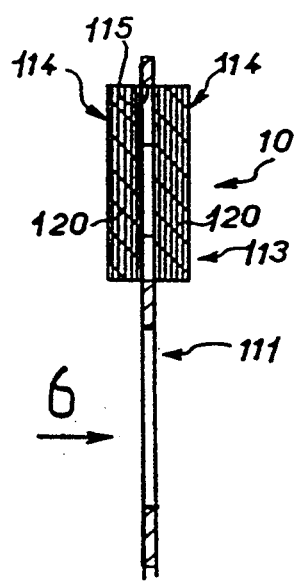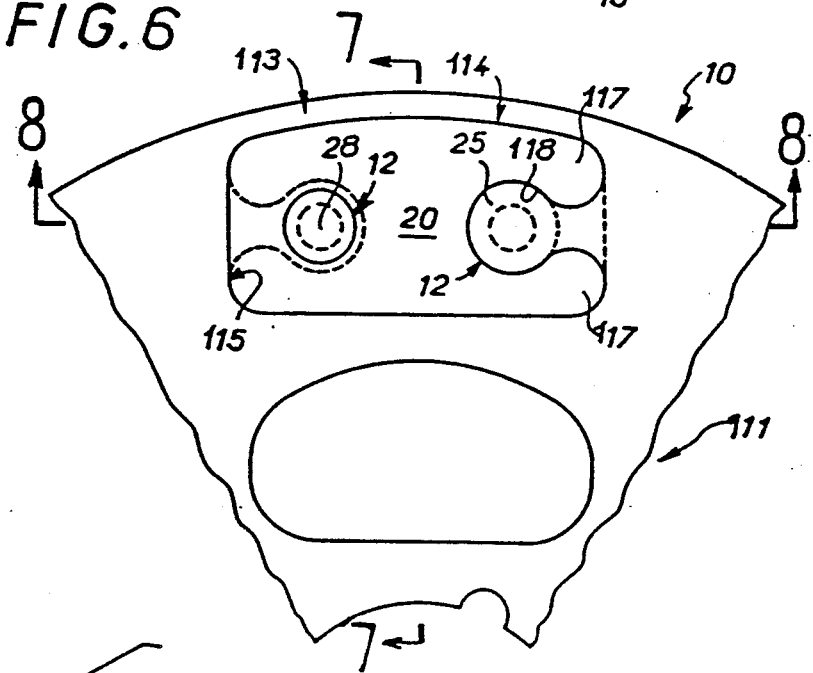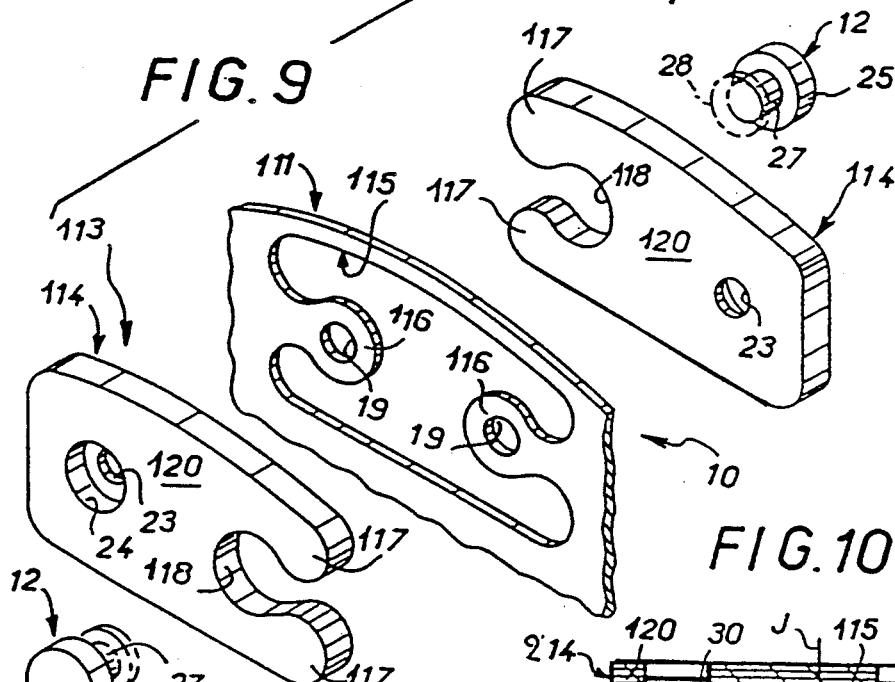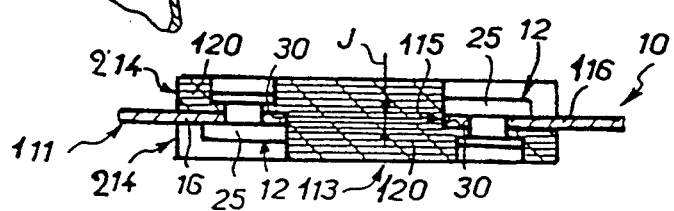

FRICTION DISC, IN PARTICULAR FOR A CLUTCH

FIELD OF THE INVENTION

This invention relates to friction discs, and in particular to a friction disc for a motor vehicle clutch, of the kind comprising a carrier disc for carrying friction pads, and a plurality of friction pads carried by, and distributed around the centre of, the carrier disc, with each friction pad being secured to the latter by means of at least one fastening member, each friction pad being in the form of two pad portions which are arranged respectively on either side of the carrier disc.

BACKGROUND OF THE INVENTION

Each time the clutch is engaged, the friction pads become progressively gripped between a pressure plate and a reaction plate of the clutch. The heat generated by the friction in the clutch leads inevitably to the pressure plate gradually assuming a conical form. The same is true of the reaction plate, even though its conicity is not so pronounced as for the pressure plate. As a result, the interface zone in which each friction pad is subjected to pressure from the adjacent reaction or pressure plate, as the case may be, progressively moves towards the axis of the assembly. Consequently the friction pads are subjected to uneven wear and a reduction in their effectiveness. This can even lead to possible breakage of the friction pads.

In some friction discs, some kind of suitable resilient means are provided between the two portions of a friction pad in order to give a certain degree of progressive engagement of the clutch. These resilient means can, at least to some extent, reduce the drawback mentioned above, by allowing some play between the two portions of the friction pad, and thus by following any tendency of the reaction and pressure plates to adopt a conical profile.

However, in order to give an effective progressive engagement of the clutch, these resilient means must be relatively stiff, whereas they should be of relatively low stiffness to enable there to be a satisfactory amount of play or deformation between the portions of each pad. To some extent these requirements are found to be incompatible with each other.

DISCUSSION OF THE INVENTION

An object of the present invention is to provide a friction disc in which the said portions of each pad are able to follow any conical deformation of the reaction plate and/or pressure plate, without having to have recourse to the elasticity provided by the above mentioned resilient means.

According to the invention, therefore, a friction disc comprising a carrier disc with a plurality of friction pads distributed around the centre of the carrier disc, with each friction disc being secured to the carrier disc by at least one fastening member and with each friction pad comprising two pad portions each of which is arranged on either said of the carrier disc, is characterised in that each of its friction pads is arranged in line with a window formed in the carrier disc, with the friction pad engaged at least partially at its periphery in the said window, the friction disc being further characterised in that the corresponding fastening member is secured to a tongue which extends into the said window and which is fixed with respect tot he carrier disc.

In this way, the tongue carrying the pad portions is able to undergo some buckling, so giving a tilting or swinging effect. Thus the pad portions of each friction pad are able to follow, if necessary, any possible deformation of the adjacent surface of the pressure plate and/or the reaction plate into a conical profile, by tilting or swinging around the direction in which the tongue is aligned.

In addition, having regard to the forces that are being exerted, any possible deformation of the corresponding fastening member is favourable to this tilting effect.

It is true that it is already known, for example from the specification of French published patent application No. FR 2 375 494A, to provide a friction disc in which each friction pad is itself arranged in line with a window formed through the carrier disc on which the friction pads are mounted. However, in that specification, resilient means are preferably also provided between the said portions of each friction pad, the latter being totally free with respect to the carrier members without there being any fastening members for securing them to the latter. It follows that the carrier members have to be quite thick in order to retain the friction pads in position. To this end, the carrier member cannot be a simple radial plate: for this reason there is an increase in the axial size of the assembly, while the carrier member is, because of its relatively large thickness, unfavourable to the required tilting effect of the portions of the friction pads.

By contrast, the friction disc in accordance with the present invention is able to have a thin carrier member in the form of a simple radial plate, which is such as to favour the required tilting effect.

The various features and advantage of the invention will become clearer from the following description of preferred embodiments of the invention, given by way of example only and with reference to the accompanying drawings.

BRIEF DESCRIPTION OF THE DRAWINGS

FIG. 1 is a view in elevation, in the direction indicated by the arrow 1 in FIG. 2, of part of a friction disc in accordance with the invention.

FIGS. 2, 3 and 4 are further partial views of the same friction disc, seen in cross section on the lines 2—2, 3—3 and 4—4 in FIG. 1.

FIG. 5 is another partial view of the same friction disc, shown in exploded perspective.

FIGS. 6, 7, 8 and 9 are partial views similar to FIGS. 1, 2, 3 and 5 respectively, but showing a second embodiment of the invention.

FIG. 10 is a partial view in cross section, similar to that of FIG. 8, showing a further embodiment of the invention.

DESCRIPTION OF PREFERRED EMBODIMENTS OF THE INVENTION

Generally, and as is seen in the drawings, a friction disc 10 comprises a metal plate or carrier disc 11, circular in shape and relatively thin. A plurality of friction pads 13 are distributed around the centre of the carrier disc 11, with each friction pad 13 being secured to the disc 11 by means of at least one fastening member 12, which in this example is a simple rivet. Each friction pad 13 comprises two pad portions 14, arranged on either side of the carrier disc 11.

Each friction pad 13 is arranged in line with a window 15 formed through the carrier disc 11, and is able to engage at least partly at its periphery in the window 15. A tongue 16 is formed integrally with the carrier plate 11, by a pressing operation to form the window 15 in the latter. The tongue 16 extends into the window 15 as can be seen in FIG. 1, and lies in the same plane as the remainder of the carrier plate 11. As may be seen in FIG. 3, the fastening member 12 which secures the pad 13 to the plate 11 engages with the tongue 16. In FIGS. 1 to 5, the tongue 16 extends continuously from one of the two opposite sides of the window 15 to the other, being substantially tangential to a notional coaxial with the carrier plate 11.

The general direction in which the tongue 16 is aligned is indicated in FIG. 1 by a phantom line D. In conjunction with this, each of the friction pads 13 (and thus also each of the pad portions 14 of the friction pad) has an H-shaped contour as seen in plan, with two branches 17 on either side of the "H" defining between them a slot 18. In this embodiment, there is only a single fastening member 12, common to both of the pad portions 14 and securing the friction pad in the central zone of the corresponding tongue 16, which has a hole 19 for this purpose.

In addition, each of the pad portions 14 includes a support plate 21 underlying the working portion 20 of the friction pad which comprises a block of friction material. The support plate 21 includes at least one lateral lug 22 which is bent generally at right angles to the plate, as can be seen in FIG. 4. This lug 22 is engaged in the corresponding window 15 for contact with the appropriate edge of the latter (a side edge in this example), and thus acts as a guide for the assembly. In the present example, there are two of these lugs 22, arranged along a common side edge of the window 15, for each pad portion 14. One lug 22 is arranged on each of the branches 17, while as between one pad portion 14 and the other, the relevant side edge of the window 15 is inverted.

In order to enable the fastening member 12 to pass through, the clock 20 of friction material in each pad portion 14 has an aperture 23 at the base of a recess 24, the latter being such as to receive the head 25 of the fastening member 12. The corresponding support plate 21 has an aperture 26. After being engaged in the various apertures 19, 23 and 26 through which it passes, the end 28 of the shank 27 of the fastening member 12 is upset as is indicated in phantom lines in FIG. 5.

It will now be readily understood that the tongue 16, carrying both of the portions 14 of a friction pad 13, is able to twist or bend on itself, having regard to its relatively low thickness, by torsion about its general longitudinal direction D. This enables the friction pad 13 to tilt with respect to the window 15 in the corresponding radial direction of the carrier disc 11, and thus to follow, if necessary, any possible conicity of the plates between which it is to be gripped. During such a tilting action, the friction pad 13 engages at its periphery at least partially in the window 15.

In the second embodiment, shown in FIGS. 6 to 9, two separate tongues 116 are provided for each friction pad 113. These tongues 116 extend towards each other from the two opposed sides of the corresponding window, 115, and are disposed (as before) substantially tangentially to a common coaxial circle of the carrier disc, 111.

Each of the friction pads 113 has a C-shaped profile as seen in plan view, with two branches 117 and a slot 118 defined between there branches. Two fastening members 12 are provided, one to each tongue 116, for fastening each friction pad 113.

In this example, the portions 114 that constitute a single friction pad 113 consist simply of respective blocks of friction material 120, and they extend circumferentially in opposite directions to each other, so that their respective slots 118 are open to opposite sides.

Each fastening member 12 secures only one of the portions 114 of the friction pad to the carrier plate 111. The head 25 of each fastening member 12 is engaged in the corresponding slot 118, and its profile as seen in plan (which in this example is circular) is at least partly complementary to the profile of the corresponding slot 118. As a result, with the fastening members 12 fixed with respect to the pad portions 114, the latter form to some extent conjugated shapes which enable them to act as mutual guides for each other. The remainder of the construction of the arrangement shown in FIGS. 6 to 9 is the same as that shown in FIGS. 1 to 5.

In the third embodiment shown in FIG. 10, each of the portions 214 of the friction pad has a rebate 30 on the side corresponding to the side of the tongue 116 with which it is engaged, and in fact engages the latter by means of this rebate 30. This improves the ability of the assembly to hold together, while still leaving it free to tilt as desired. Preferably however, a small clearance J, which may for example be of the order of 0.2 mm, is left between the pad portions 214 in the window 115.

It should be emphasised that the arrangement described above in various forms is of particular advantage when the friction material that is used for the friction pads is subjected in use to a high temperature. This material may for example be a carbon based material or a metal-ceramic material.

The invention is of course not limited to the embodiments described above and shown in the drawings, but embraces all possible modifications and/or combinations of the various elements. In particular, instead of being a side edge of the window in the carrier plate, the edge of the latter along which the portions of a friction pad may be guided could just as well be a circumferential edge of the window.

What is claimed is:

1. A friction disc comprising:
   a carrier disc comprising a plurality of windows formed therethrough and spaced circumferentially around a center of said carrier disc, each of said windows having at least one tongue projecting from said carrier disc into said window;
   a plurality of friction pads corresponding to said plurality of windows, each of said plurality of friction pads comprising two pad portions arranged on opposite sides of said carrier disc; and
   at least one fastening member securing each of said friction pads to a corresponding said at least one tongue;
   wherein each of said plurality of friction pads extend through and engage said corresponding window.

2. A friction disc according to claim 1, wherein each said at least one tongue extends continuously between two opposed sides of each said corresponding window.

3. A friction disc according to claim 2, wherein each said friction pad is H-shaped in plan, there being a single said fastening member for each of said plurality of friction pads, said single fastening member securing both of its said pad portions and engaging a middle zone of the corresponding tongue.

4. A friction disc according to claim 3, wherein each said portion of a friction pad includes a support plate having at least one lateral lug defining an end portion of the lug which is generally bent at right angles to the remainder of the support plate, with each said lug being engaged in the corresponding said window.

5. A friction disc according to claim 1, wherein the carrier disc has two said tongues for each said friction pad, the two tongues extending towards each other from two opposed sides of the corresponding window.

6. A friction disc according to claim 5, wherein each said friction pad is C-shaped in plan, there being two said fastening members for each said friction pad, each of the two said pad portions of the friction pad defining a slot, with each one of said two fastening members securing only a respective one of said pad portions to the carrier disc and laying in said slot of the other.

7. A friction disc according to claim 6, wherein each said fastening member has a head, the head of the fastening member being configured to complement, at least in part, the associated slot.

8. A friction disc according to claim 5, wherein each of said pad portions defines a hollow rabbet on a side facing said corresponding tongue, and each of said pad portions is engaged with the tongue by means of its said rabbet.

9. A friction disc according to claim 1, wherein each said tongue extends substantially tangentially to a circumference of the carrier disc.

10. A friction disc according to claim 1, wherein said tongue is integral with the carrier disc.

* * * * *